United States Patent [19]

Guell

[11] Patent Number: 4,539,966
[45] Date of Patent: Sep. 10, 1985

[54] GAS SAVING APPARATUS

[75] Inventor: Mario R. Guell, Bogalusa, La.

[73] Assignee: Tri-Saver Corporation, Thibodaux, La.

[21] Appl. No.: 618,365

[22] Filed: Jun. 6, 1984

[51] Int. Cl.³ .............................................. F02M 31/00
[52] U.S. Cl. .................................. 123/557; 123/525; 123/578
[58] Field of Search ............... 123/557, 523, 522, 524, 123/525; 261/30, 142, 144, 145

[56] References Cited

U.S. PATENT DOCUMENTS

| 2,285,905 | 6/1942 | Cunningham | 123/523 |
| 2,711,718 | 6/1955 | Spanjer | 123/555 |
| 3,738,334 | 6/1973 | Farr | 123/557 |
| 3,854,463 | 12/1974 | Burden | 123/557 |
| 4,351,301 | 9/1982 | Allen | 123/557 |
| 4,372,276 | 2/1983 | Bernhardsson | 123/575 |

Primary Examiner—Ronald H. Lazarus
Attorney, Agent, or Firm—Harvey B. Jacobson

[57] ABSTRACT

A fuel and air mixture induction system is provided for an internal combustion engine and includes a conventional air and fuel mixing carburetor for starting the engine when the latter is cold. However, when operating temperatures of the engine are reached the air and fuel induction system is operative to more thoroughly vaporize liquid fuel by pressurizing and heating not only the induction air but also the fuel and spraying the heated fuel into the heated induction air in a manner such that substantially complete fuel atomization and vaporization occurs. This pressurized fully vaporized fuel and air charge is thereafter discharged in a downstream direction into the air and fuel passage of the carburetor closely upstream from the venturi area thereof. The supply of liquid fuel to the carburetor is maintained, but the fuel flow from the carburetor float chamber is automatically reduced when the supply of vaporized fuel and air is furnished because the air and vaporized fuel is supplied to the carburetor under a low pressure thus effectively reducing the reduced venturi area pressure normally associated with a carburetor and the flow of fuel from the carburetor float chamber to the venturi area. In addition, normal opening of the throttle valves is decreased when the supply of heated air and fully vaporized fuel is supplied to the carburetor. Therefore, a smaller amount of air and fuel vapors pass through the carburetor to further reduce the vacuum at the venturi passage and thus the flow of fuel from the carburetor flow chamber into the venturi passage.

8 Claims, 5 Drawing Figures

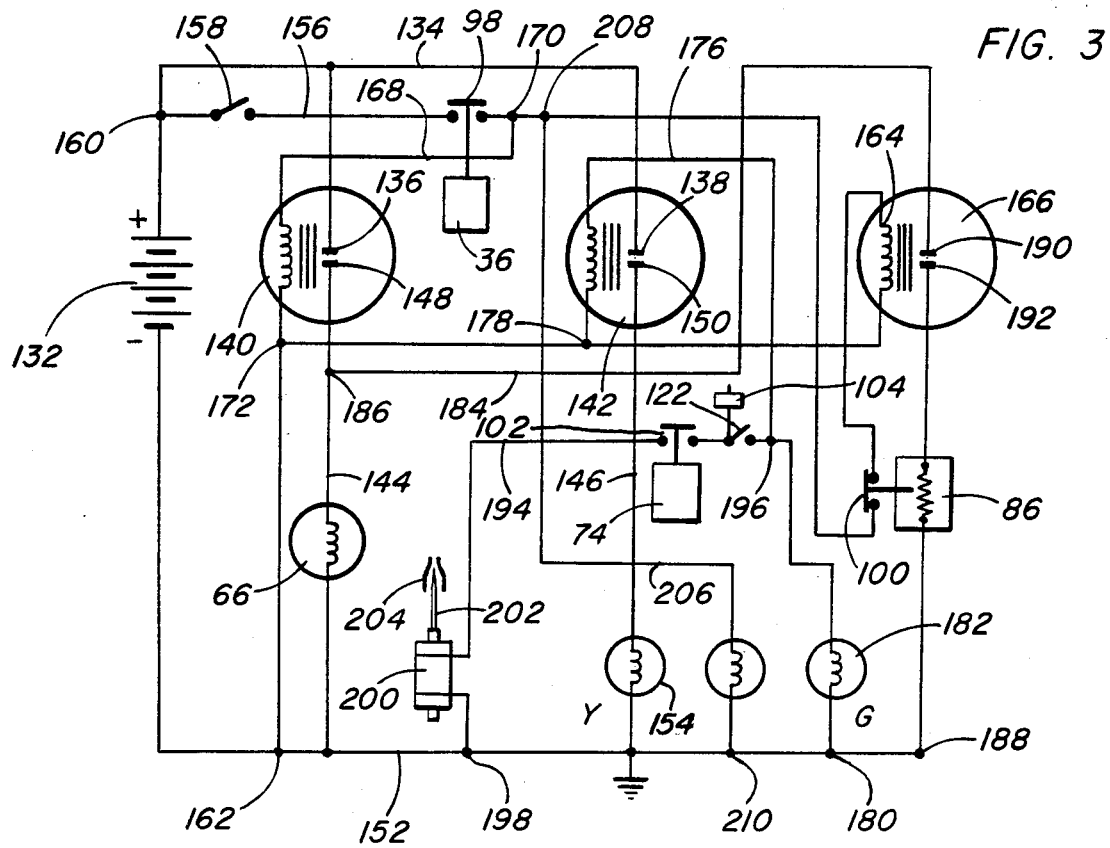
FIG. 3
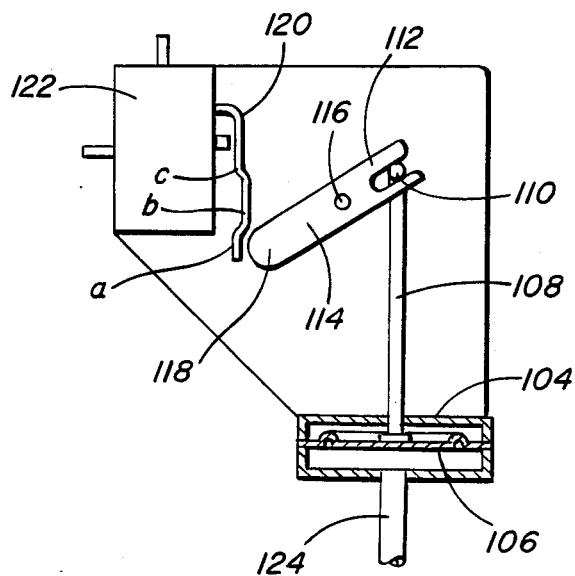
FIG. 4
FIG. 5

GAS SAVING APPARATUS

BACKGROUND OF THE INVENTION

Because of the present emphasis upon fuel economy and reduced exhaust emissions, various methods of increasing the efficiency of internal combustion engines and reducing the exhaust emissions thereof are being tested, evaluated and placed in use. However, many air and fuel induction systems which may be efficient at one temperature are inefficient at other engine operating temperatures.

Various types of structures have been incorporated into air and fuel induction systems designed to promote fuel economy and to reduce exhaust emissions, but many of these have proven ineffective, at least to some degree, mainly because of the use, in most cases, of vaporizing tanks and flow controls. It has been found by research that fuel being heated and recirculated in these tanks loses, with time, its vaporization qualities making the flow controls ineffective. This cause and effect is compounded by the fact that much of the fuel is recirculated without substantial addition of fresh fuel, because the volume of fuel in the tank remains the same. The fuel saving apparatus of the instant invention incorporates no evaporator tank or flow controls and all fuel supplied to the fuel vaporizing portion of the system is used.

Examples of various forms of fuel vaporizing structures including some of the general structural and operational features of the instant invention are disclosed in U.S. Pat. Nos. 1,833,552, 2,319,971, 3,496,919, 3,765,382, 3,963,013, 4,015,569, 4,040,403, 4,092,962, 4,174,691, 4,190,030, 4,319,554 and 4,395,995.

BRIEF DESCRIPTION OF THE INVENTION

The air and fuel charge forming device of the instant invention utilizes a conventional carburetor for starting the associated combustion engine when the latter is cold and provides structure for heating the induction air and subjecting the heated induction air to a spray discharge of heated liquid fuel for fully vaporizing the fuel before passing the vaporized fuel and air through the conventional carburetor when operating temperatures of the associated combustion engine have been reached. The supply of liquid fuel to the conventional carburetor remains the same when operating temperatures have been reached, but liquid fuel flow through the carburetor main metering jets is substantially reduced, automatically.

The main object of this invention is to provide an air and fuel charge forming device which will be capable of increasing the fuel economy of a combustion engine and reducing the exhaust emissions from the engine, without any changes to the existing pollution emission controlling systems after the engine has reached its operating temperature.

Another object of this invention is to provide an air and fuel charge forming device which may be readily incorporated into the manufacture of present day vehicle internal combustion engines.

Still another object of this invention is to provide an air and fuel charge forming device which may be readily added to vehicle combustion engines which are presently in use.

Yet another object of this invention is to provide an air and fuel charge forming device which utilizes engine driven air pump means to establish induction air and vaporized fuel pressures effective to substantially nullify the usual carburetor venturi barrel vacuum to draw fuel from the carburetor float chamber into the venturi barrel.

A final object of this invention to be specifically enumerated herein is to provide an air and fuel charge forming device which will conform to conventional forms of manufacture, be of simple construction and substantially automatic in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a diagrammatic view of the electrical circuitry of the instant invention;

FIG. 4 is a schematic view of a typical intake manifold vacuum switch to be used in conjunction with the instant invention; and FIG. 5 is a perspective view of a baffle ring portion of the instant invention to be utilized as an inlet extension for the air intake horn of the associated carburetor.

DETAILED DESCRIPTION OF THE INVENTION

Figure 1:
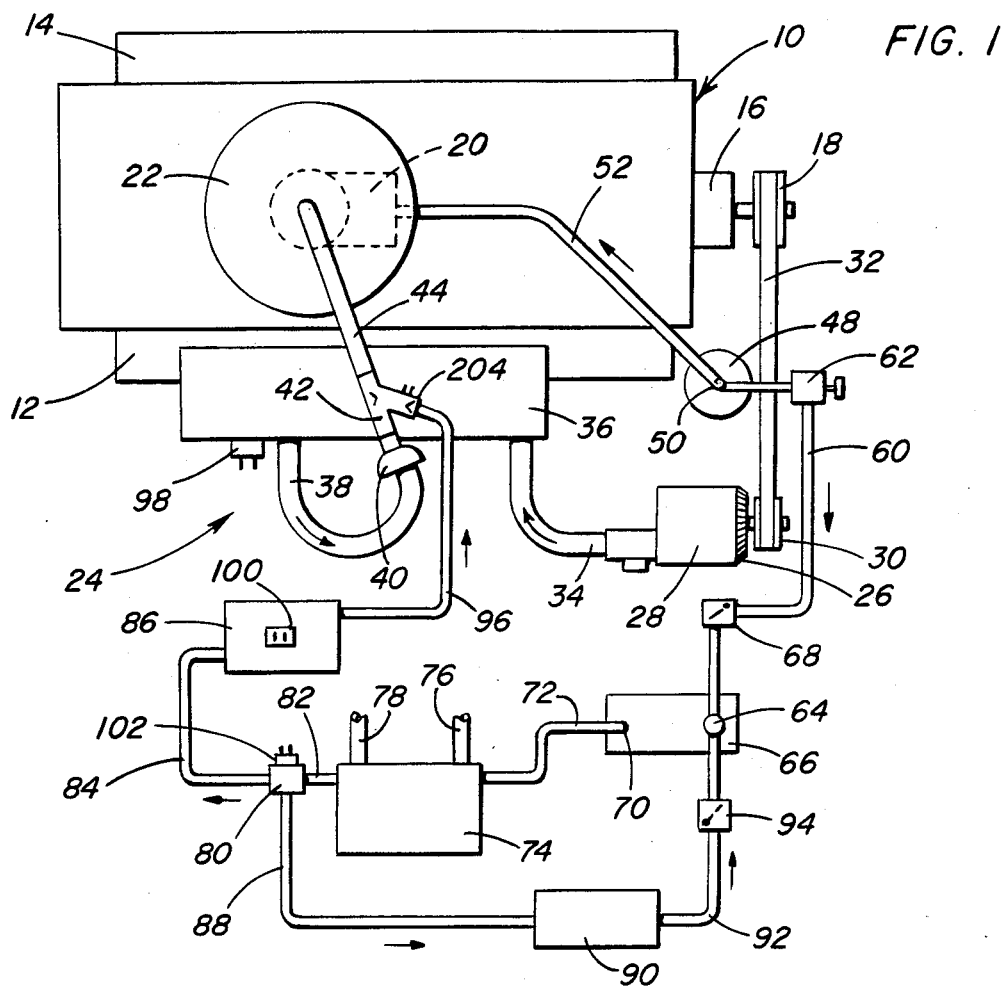
FIG. 1 is a schematic top plan view of a conventional combustion engine with which the air and fuel charge forming device of the instant invention is operatively associated.

Referring now more specifically to the drawings the numeral 10 generally designates a conventional form of combustion engine including a pair of opposite side exhaust manifolds 12 and 14, a motor driven water pump 16 provided with a drive pulley 18 and a conventional carburetor 20 having a conventional air cleaner 22 operatively associated therewith. The carburetor 20 is mounted on the intake manifold (not shown) of the engine 10, as is conventional, and the air and fuel charge forming device of the instant invention is referred to in general by the reference numeral 24 and includes an air inlet 26 comprising the air inlet of an engine driven air pump 28 including a rotary power input pulley 30 driven from the pulley 18 by an endless belt 32 trained about the pulleys 18 and 30. The air pump 28 may comprise a low capacity supercharger or an emissions control air pump of the type conventionally utilized to supply air under pressure to the exhaust ports of an internal combustion engine.

The air pump 28 includes a pressurized air outlet 34 which discharges into a heat exchanger box or chamber 36 mounted in good heat transfer relation with the exhaust manifold 12 for receiving heat therefrom. The heat exchanger box or chamber 36 includes an air outlet 38 provided with a check valve 40 and including an outlet end in closed communication with a heated air and heated liquid fuel vaporizing chamber 42. The chamber 42 includes an outlet pipe 44 opening outwardly therefrom and passing downwardly through the central portion of the top of the air cleaner 22 and discharging into the inlet end of the air inlet horn 46 of the carburetor 20.

The engine 10 further includes a conventional fuel pump 48 incorporating a fuel outlet 50 and a line 52 extends from the outlet 50 to the float chamber 54. The interior of the carburetor 20 incorporates a venturi passage 56 into which an inclined passage 58 from the float chamber 54 opens.

A line 60 having a manually operable fuel flow shut-off valve 62 serially connected therein extends from the outlet 50 of the inlet 64 of an electric fuel pump 66 and the line 60 further includes a check valve 68 serially connected therein between the valve 62 and the inlet 64. The electric fuel pump 66 includes an outlet 70 to which the inlet end of a line 72 is connected and the outlet end of the line 72 opens into a heat exchanger 74 to which heat is supplied from the liquid cooling system of the engine 10 through inlet and outlet lines 76 and 78. The heat exchanger 74 discharges heated liquid fuel to a pressure regulator 80 through a pipe 82 and the regulator 80 includes a primary fuel outlet to which the inlet end of a line 84 is connected. The discharge end of the line 84 opens into an electric fuel heater 86. The pressure regulator 80 also includes a secondary fuel outlet to which the inlet end of a return pipe 88 is connected and the return pipe 88 discharges into a fuel cooler 90 (which may be air cooled). The fuel cooler 90 discharges cooled fuel therefrom via a line 92 having a check valve 94 serially connected therein and the line 92 discharges into the inlet 64 for the electric fuel pump 66.

The electric fuel heater 86 discharges heated fuel to the chamber 42 through a line 96 and fuel under pressure from the line 96 is sprayed into the chamber 42 in a manner to be set forth hereinafter.

The box or chamber 36 has a thermostatic switch 98 operatively associated therewith and the electric fuel heater 86 has a thermostatically controlled switch 100 operatively associated therewith while the pressure regulator 80 has a thermostatic switch 102 operatively associated therewith.

A manifold vacuum actuated dashpot 104 (FIG. 4) is provided and includes a spring-biased diaphragm 106 to which one end of an operating rod 108 is connected. The other end of the operating rod 108 includes a sliding and pivotal connection, as at 110, with one end 112 of a switch operating lever 114 pivotally mounted as at 116. The other end 118 of the lever 114 is operatively associated with a spring type switch actuator 120 for controlling a three position snap-action type switch 122. The actuator includes three areas a, b and c engageable by the end portion 18 of the lever 14 responsive to changes in manifold vacuum with which the diaphragm 106 is communicated through a hose 124. Further, it may be seen from FIGS. 2 and 5 of the drawings that the air horn 46 of the carburetor 20 has a baffle ring 130 operatively associated therewith for receiving the pressurized heated air and fuel vapors from the line 44.

With attention now invited more specifically to FIG. 3 of the drawings, the numeral 132 designates a source of electrical potential such as the battery of the associated vehicle. A first circuit 134 connects the battery 132 to the contacts 136 and 138 of a pair of normally open relay switches 140 and 142 and a pair of conductors 144 and 146 connect the second contacts 148 and 150 of the relay switches 140 and 142 to a ground conductor 152 which is in turn electrically connected to the negative side of the battery 132. The conductor 144 has the electric fuel pump 66 serially connected therein and the conductor 146 has a yellow indicator lamp 154 serially connected therein. A loop circuit 156 having the ignition switch 158 of the engine 10 serially connected therein extends between the first circuit 134 as at 160 and the ground conductor 152 as at 162. The loop circuit 156 has the thermostatic switch 98 serially connected therein as well as the thermostatic switch 100 and the actuating coil 164 of a third relay 166. The thermostatic switch 98 is normally open and the thermostatic switch 100 is normally closed.

A conductor 168 is electrically connected with the circuit 156 as at 170 and 172 and has the actuating coil 174 of the first relay switch 140 serially connected therein. Further, a conductor 176 is connected to the loop circuit 156 as at 178 and to the ground conductor 152 as at 180 and has a green indicator light 182 serially connected therein. Yet another conductor 184 is connected to the conductor 144 as at 186 and to the ground conductor 152 as at 188. The conductor 184 has the normally open contacts 190 an 192 of the third relay switch 166 serially disposed therein as well as the electric fuel heater 86. Also, yet another conductor 194 is connected between the conductor 176 as at 196 and the ground conductor 152 as at 198 and has the normally open contacts of the thermostatic switch 102 serially connected therein as well as the contacts of the normally open switch 122. The switch 102 senses the temperature of the heated fuel being discharged from the fuel heat exchanger 74 and the switch 122 is closed only when the lever 114 is in the (b) position. Further, the conductor 194 also has the solenoid 200 serially connected therein. The solenoid 200 controls a needle valve member 202 of the spray nozzle 204 into which the discharge end of the line 96 opens, the spray nozzle 204 being disposed within the chamber 42. Finally, a conductor 206 is connected between the loop circuit as at 208 and the ground conductor 152 at 210 and has a red indicator light 212 serially connected therein.

Figure 2:
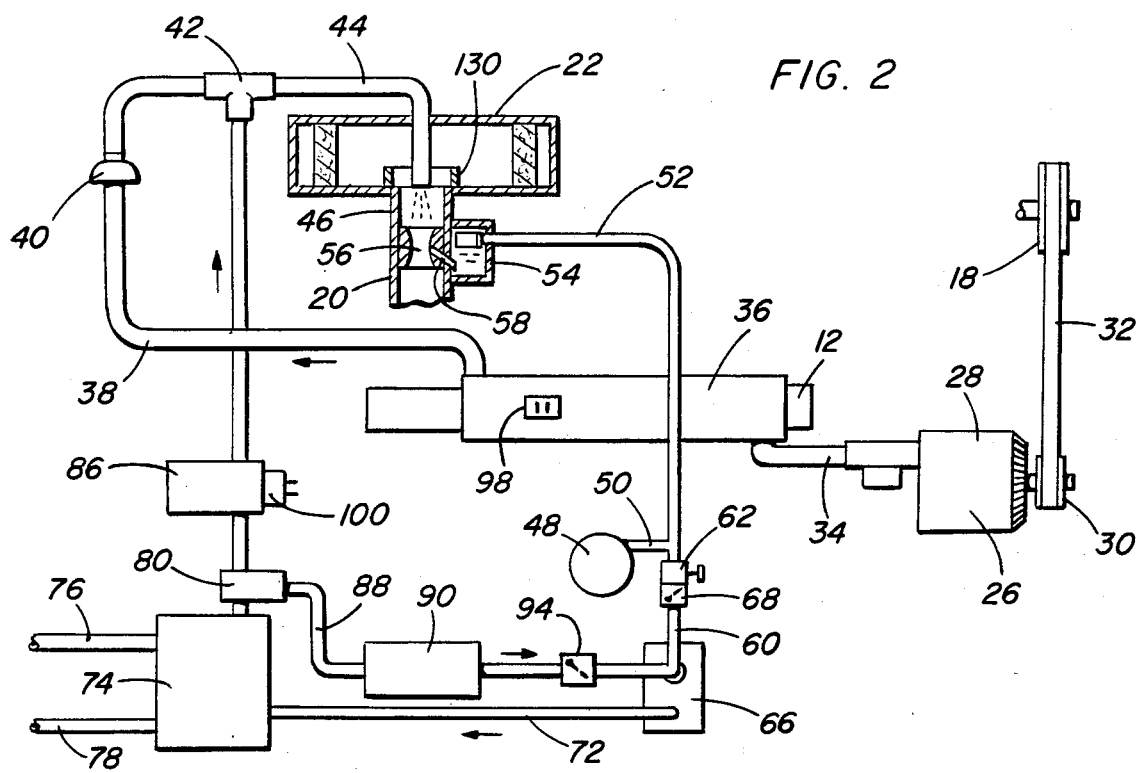
FIG. 2 is a further schematic view illustrating the working components of the air and fuel charge forming device, with only the exhaust manifold, air cleaner, carburetor and power output shaft of the associated combustion engine being illustrated.

In operation, when it is desired to start the engine 10 when the latter is cold, the ignition switch 158 is closed and the engine 10 is started in the usual manner with fuel being supplied to the air and fuel passages of the carburetor 20 from the float bowl 54 through the inclined passage or pipe 58, see FIG. 2.

When the interior of the heat exchanger 36 reaches 110° the thermostatic switch 98 closes and current is supplied throughout the loop circuit 156 and thus passes through the normally closed contacts of the electric fuel heater 86 and the energizing coil 164 of the third relay switch 166. In addition, current is supplied to the conductor 168 and the energizing coil 174 of the first relay switch 140 and through the conductor 176 to activate the second relay switch 142. Thus, the yellow indicator light, the red indicator light and the green indicator light are actuated and current also flows through the conductor 184 and thus activates the electric fuel heater 86.

When the temperature of the heat exchanger 74 sensed by the thermostatic switch 102 reaches 110°, the thermostatic switch 102 closes, but the contacts of the switch 122 remain open unless normal manifold vacuum (between approximately 6 to 21 inches of vacuum) is experienced by the dashpot 104. At all other times when less than 6 inches of vacuum are experienced by the dashpot 104 or more than 21 inches of vacuum are experienced by the dashpot 104 the switch 122 remains closed. Accordingly, as soon as the necessary temperatures are experienced at the thermostatic switch 98 and the thermostatic switch 102 the solenoid 200 is actuated to open the spray nozzle 204 and to allow heated fuel under pressure to be spray injected into the chamber 42 for mixing with the air admitted into the chamber 42 through the pipe 38. Inasmuch as the air being supplied to the chamber 42 during normal speed operation of the engine 10 is under pressure, the usual vacuum in the venturi barrel or passage 56 will be reduced and the usual flow of fuel from the float bowl to the passage 56 will be automatically reduced whereby substantially all fuel supplied to the passage 56 will be discharged from the outlet pipe 44. This fuel has been heated, sprayed into the chamber 42 and mixed with heated air and is thus fully vaporized by the time it enters the passage 56 and thereafter passes into the cylinders of the engine 10. In this manner, complete atomization of the liquid fuel is realized and the power and fuel economy of the engine 10 are increased. Should the thermostatic switch 100 sense that the temperature of fuel being discharged from the electric fuel heater 86 is too great, the switch 100 opens to terminate operation of the electric fuel heater. Further, the thermostatic switch 102 senses the temperature of the fuel being discharged from the heat exchanger 48 and allows discharge of fuel into the line 86 only when the temperature of fuel being discharged from the heat exchanger 74 is at least 110° F.

Thus, the engine 10 may be started conventionally and the fuel supply thereto may be automatically transferred from the carburetor to the nozzle 204 as soon as engine operating temperatures have been reached.

It is pointed out that the air pump 28 is of low volume capacity as compared to the normal intake of air by the engine 10 and, therefore, that operation of the engine 10 during the warm-up period before air and fuel is discharged into the carburetor from the outlet pipe 44 is not adversely affected. During operation of the engine 10 after engine operating temperatures have been reached the volume of air discharged into the carburetor from the air pump 28 comprises only so much heated air as is required to vaporize the heated fuel supplied through the pipe 44. Accordingly, operation of the engine 10 after normal engine operation temperatures have been reached still includes a reasonable amount of ambient air drawn inwardly through the air cleaner 22.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a combustion engine incorporating an air and fuel induction system including a carburetor defining air and fuel passage means extending therethrough including an inlet end for intaking ambient air, an outlet end for discharging an air and fuel mixture into intake passages of said engine and liquid fuel inlet means for admitting liquid fuel into an intermediate length venturi zone of said passage means in amounts proportional to increases and decreases in the venturi vacuum as a result of increases and decreases in the amount of air flowing through said zone, a supplemental air and fuel charge forming system including heated pressurized liquid fuel supply means, heated pressurized air supply means and heated fuel and air mixing means for receiving and mixing heated pressurized air and fuel and mixing the heated pressurized air and heated pressurized fuel to substantially fully vaporize the heated fuel in the heated pressurized air and form a pressurized and heated charge of vaporized fuel and air, said mixing means including pressurized air and fuel charge discharge means operative to discharge said heated charge into said passage means intermediate the inlet end thereof and said venturi zone in a downstream direction in said passage means closely upstream from said venturi zone with the discharging of the charge of pressurized air and vaporized fuel into said passage means being operative to, automatically, at least substantially reduce the usual vacuum associated with a carburetor venturi for drawing liquid carburetor fuel thereinto and to thereby at least substantially eliminate the usual introduction of liquid fuel from the carburetor into said venturi passage.

2. The system of claim 1 wherein said fuel and air mixing means includes pressurized air passage means extending therethrough and means for spray discharging heated liquid fuel into said pressurized air passage means.

3. In combination with a combustion engine incorporating an air and fuel induction system including a carburetor defining air and fuel passage means extending therethrough including an inlet end for intaking ambient air, an outlet end for discharging an air and fuel mixture into intake passages of said engine and liquid fuel inlet means for admitting liquid fuel into an intermediate length venturi zone of said passage means in amounts proportional to increases and decreases in the venturi vaccum as a result of increases and decreases in the amount of air flowing through said zone, a supplemental air and fuel charge forming system including heated pressurized liquid fuel supply means, heated pressurized air supply means and heated fuel and air mixing means for receiving and mixing heated pressurized air and fuel and mixing the heated pressurized air and heated pressurized fuel to substantially fully vaporize the heated fuel in the heated pressurized air and form a pressurized and heated charge of vaporized fuel and air, said mixing means including pressurized air and fuel charge discharge means operative to discharge said heated charge into said passage means intermediate the inlet end thereof and said venturi zone in a downstream direction in said passage means, said liquid fuel supply means including thermostatically controlled liquid fuel heating means.

4. The system of claim 1 wherein said engine includes an exhaust system and said pressurized air supply means includes heat exchange means operatively associated with said exhaust system for receiving heat therefrom and using the received heat for heating said pressurized air.

5. The system of claim 3 wherein said heated liquid fuel supply means includes a fuel pump having an inlet for receiving liquid fuel from a suitable supply of liquid fuel and an outlet for supplying pressurized fuel to said mixing means, said heated fuel supply means further including waste engine heat exchange means for heating the fuel discharged from said fuel pump.

6. The system of claim 1 wherein said mixing means also including control means operative to interrupt the supply of heated fuel to said mixing means responsive to low and high manifold vacuum operating conditions of said engine.

7. The system of claim 6 wherein said heated pressurized air supply means includes an engine driven air pump.

8. In combination with a combustion engine incorporating an air and fuel induction system including a carburetor defining air and fuel passage means extending therethrough including an inlet end for intaking ambient air, an outlet end for discharging an air and fuel mixture into intake passages of the engine and fuel inlet means for admitting fuel into an intermediate length venturi zone of said passage means in amounts proportional to increases and decreases in venturi vacuum as a result of increases and decreases in the amount of air flowing through said zone, a supplemental air and fuel charge forming system including heated pressurized liquid fuel supply means, heated pressurized air supply means and heated fuel and air mixing means for receiving and mixing heated pressurized air and heated pressurized fuel to substantially fully vaporize the heated fuel in the heated pressurized air, said mixing means also including control means operative to interrupt the supply of heated fuel to said mixing means responsive to low and high manifold vacuum operating conditions of said engine, said heated pressurized air supply means including an engine driven air pump, said air supply means including engine exhaust heated heat exchange means for heating air discharged from said air pump.

* * * * *